Dec. 3, 1963 D. HALLBAUER 3,112,839
COVER LATCH FOR METER SOCKET
Filed Feb. 1, 1962 2 Sheets-Sheet 1
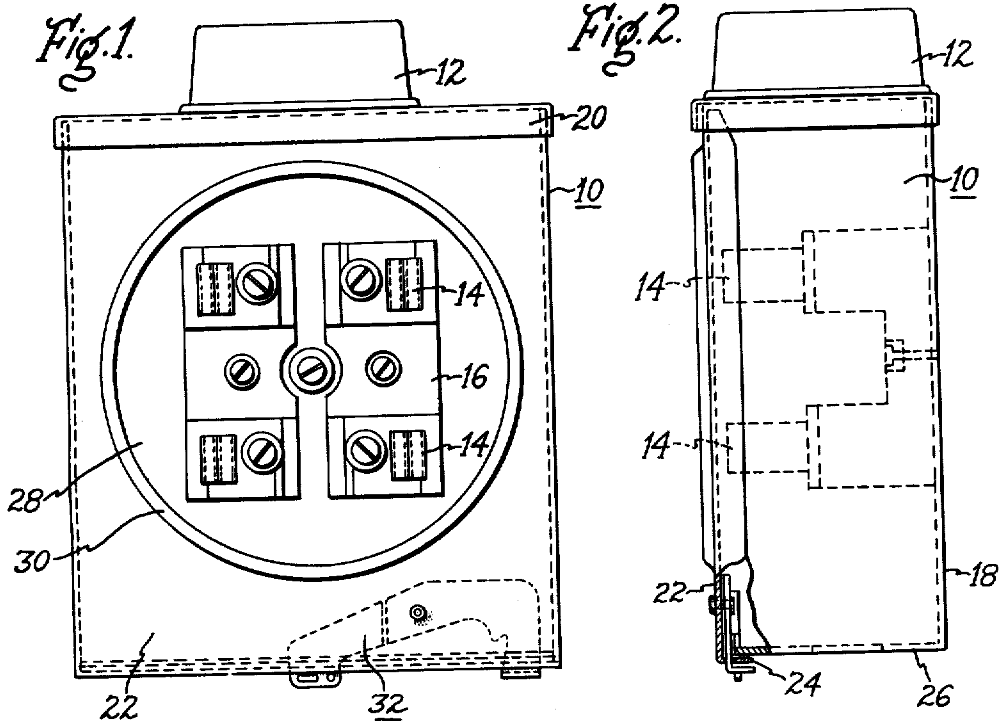
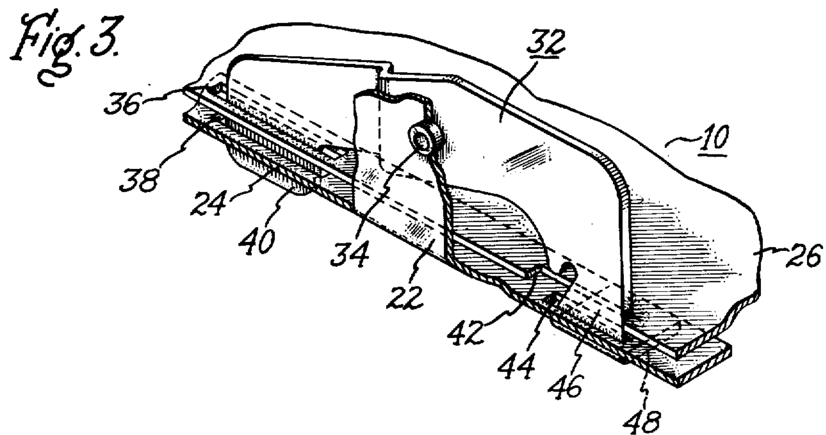
Inventor,
Dankmar Hallbauer,
by Francis K. Doyle
His Attorney.

COVER LATCH FOR METER SOCKET

Filed Feb. 1, 1962 2 Sheets-Sheet 2

Inventor,
Dankmar Hallbauer,
by Francis X. Doyle
His Attorney.

United States Patent Office 3,112,839

Patented Dec. 3, 1963

3,112,839

COVER LATCH FOR METER SOCKET

Dankmar Hallbauer, Berwick, Maine, assignor to General Electric Company, a corporation of New York Filed Feb. 1, 1962, Ser. No. 170,445
4 Claims. (Cl. 220—3.8)

This invention relates to meter sockets, and more particularly, to a novel cover latch for securing the cover to a meter socket.

In the meter socket field, two different types of sockets are recognized. One type is known as a ring socket in which the socket is provided with a removable cover, having an opening therein. In this type of socket, the meter generally is placed through the opening in the removable cover after the cover is locked in place on the meter socket, the meter being fastened to the cover by means of a ring which secures the meter to a flange about the opening in the removable cover. The other type of meter socket is known as a ringless socket, in this socket a removable cover is also provided having an opening therein. However, in this instance the meter is generally placed in position in the socket before the cover is placed on the meter socket. The cover is then placed on the meter socket with the opening fitting over the meter, and the removable cover is locked in place to firmly secure the meter within the ringless socket. As noted above, both types of socket generally comprise a metallic, box-like enclosure having a removable cover. The removable cover fits under an overhanging lip on the top of the metallic enclosure, and has a flange which fits under the bottom of the socket. Some type of latch means is required to firmly secure the cover to the bottom of the socket to prevent dislodging the cover and prevent unauthorized personnel from tampering with the meter, which is placed in the socket.

The removable covers of meter sockets are provided with a large opening therein through which a portion of the meter protrudes, when a meter is mounted in place in the socket. This opening extends over a substantial portion of the cover, so that there is little room left in the bottom of the cover for the latch mechanism. Further, especially in ringless sockets, it is required that the latch mechanism not obstruct the opening in the cover. This is especially true when the latch mechanism is in closed position, since, as earlier noted, in a ringless socket the meter is placed in the socket before the cover is mounted on the socket. Thus, it can be seen that in providing a cover latch for a meter socket very little space is available for such latch.

Other problems which arise in providing a latch for the removable cover of a meter socket are those of cost, which necessitate an inexpensive mechanism, as well as the requirement that the latch be sufficiently rigid to withstand abuse, especially in transportation, handling, and mounting. Further, due to underwriter approval requirements it is desirable that no openings be present in the cover other than the meter opening. Of course, it will be obvious that it is also desirable that the latching mechanism for a removable cover be simple to manufacture, easily assembled on the cover, and that it be easily operated and reliable in use. Most of the presently available latching mechanism are unsatisfactory; either because they are too expensive or complicated, or because they will not meet the necessary underwriter's tests, or because they are not reliable in use.

It is, therefore, one object of this invention to provide a novel latch mechanism for the removable cover of a meter socket which will be inexpensive to manufacture, and will be very reliable in use.

A further object of this invention is to provide a latch for a cover of a meter socket which will be inexpensive to manufacture, strong enough to withstand abuse, and which will not require additional openings in the removable cover.

Another object of this invention is to provide a latch mechanism for a meter socket cover, which is simple to manufacture and use, and which will not obstruct the opening in the meter socket cover.

A still further object of this invention is to provide a simple, inexpensive latch mechanism for a removable meter socket cover which is especially useful with ringless meter sockets.

Briefly, this invention in one form comprises a substantially U-shaped lever member adapted to be pivotally secured to a removable cover of a meter socket. One end of the U-shaped member is provided with a latch means adapted to fit through slots in the bottom of the meter socket and the cover flange, to secure the cover flange to the meter socket. The other end of the U-shaped member extends through another slot in the cover flange, and is provided with an operator for pivoting the latch into and out of engagement with the slots.

The invention which is desired to be protected will be particularly pointed out and distinctly claimed in the claims appended hereto. However, it is believed that this invention, and the manner in which its objects and advantages are obtained, as well as other objects and advantages thereof, will be better understood from the following detailed description of a preferred embodiment thereof, especially when considered in the light of the accompanying drawings, in which:

FIGURE 1 is a front view of a known type of meter socket showing one form of latch means according to this invention;

FIGURE 2 is a side view, partly in section, of the meter socket shown in FIG. 1;

FIGURE 3 is a perspective view, partly in section, of a corner of the meter socket of FIG. 1 showing the latch in greater detail;

Figure 4:
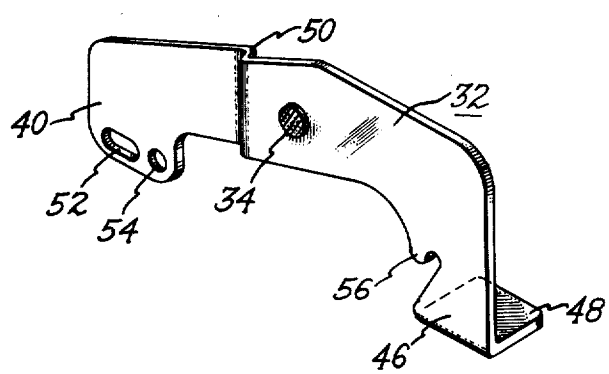
FIGURE 4 is a perspective view of the latch mechanism shown in FIG. 3.

Referring now to the drawings in which like numerals are used to indicate like parts throughout the various views thereof, and with particular reference to FIGS. 1 and 2 there is shown a meter socket 10 which has a hub member 12 at the top thereof for the reception of electrical wires, as is well understood, and is provided with a plurality of terminal jaws 14 which are mounted in mounting blocks 16 which are secured to the back wall 18 of the meter socket 10. The upper wall of the meter socket 10 is provided with an overhanging lip 20, and one end of a removable cover 22 fits under such overhanging lip. The lower end of the removable cover 22 is provided with a lower flange 24 which fits underneath the lower wall 26 of the meter socket 10. The removable cover 22 is provided with an opening 28 covering substantially the entire area of the removable cover, and is provided with a flange 30 which completely surrounds the opening 28. The above described meter is conventional, and it will be understood that the flange 30 may be adapted to accept a ring which will aid in securing a meter within the opening 28, or the flange may be as shown, that for a ringless cover in which the removable cover 22 is placed on the meter socket 10 after a meter has been placed in position in the terminal jaws 14. In order to lock the removable cover 22 on the meter socket 10, a novel latch mechanism, generally indicated at 32, is provided.

Referring now to FIGS. 3, 4, 5, and 6, the novel cover latch of this invention will be described in greater detail. Referring first specifically to FIG. 3, which is a partial sectional view of the lower corner of the ringless meter socket 10 showing the details of the cover latch, it can be seen that the cover latch 32 is riveted by means of rivet 34 to the removable cover 22. As will be understood, the rivet 34 pivotally mounts the cover latch 32 to the cover 22, such that the cover latch may be pivoted into and out of locking position with the meter socket; the position of the latching mechanism in FIG. 3 being shown as closed or locked. As can be seen from FIG. 3, the lower wall 26 of the meter socket 10 is provided with a slot 36 which cooperates with a slot 38 in the bottom flange 24 of the removable cover 22. The latching end 40 of the latch mechanism 32 is designed to fit through the slots 36 and 38 and hold removable cover 22 secure to the meter socket 10. The lower wall 26 of the meter socket 10 is also provided with a notch 42 which cooperates with a slot 44 in the cover flange 24, and which receives the opposite end of the latch 32. The opposite end of latch 32, indicated at 46, fits through the slot 44 and is turned over as indicated in dotted lines to provide an operator 48 for the pivoting of the latch 32.

Referring now to FIG. 4 of the drawing, the detailed construction of the latch 32 may be seen in greater detail, without the various portions of the meter socket 10. As shown in FIG. 4, the latch mechanism 32 comprises a U-shaped member having the latch end 40 and the operator end 46, which includes the operator member 48. As shown, the U-shaped member 32 is bent inwardly at 50 which is beyond the pivot or rivet 34 of the member 32. While the bend 50 in the U-shaped member 32 is not essential to the operation of this invention, it is desirable since it provides for moving of the latch member 40 rearwardly of the removable cover 22, such that a strong slot 36 (as shown in FIG. 3) may be provided in the base member 26 of the meter socket 10. As is also shown in FIG. 4, the latch member 40 of the lever 32 is provided with a slot 52 and an opening 54 for the reception of a sealing mechanism after the utility has placed the meter in the meter socket 10 and has secured the removable cover thereto. As is well understood by those skilled in the art, the sealing mechanism may either be an aluminum ribbon, which would fit through the slot member 52, or a wire which would fit through the opening 54; either the ribbon or the wire then being sealed to the standard sealing means of the utility company. The lever 32 may be also provided with a stop means 56 which will contact the cover flange 24 when in its open position. This is desirable since it will prevent the latch portion 40 of the lever 32 from moving too high, in the unlatched position, and interfering with the opening 28 in the removable cover 22.

Figure 5:
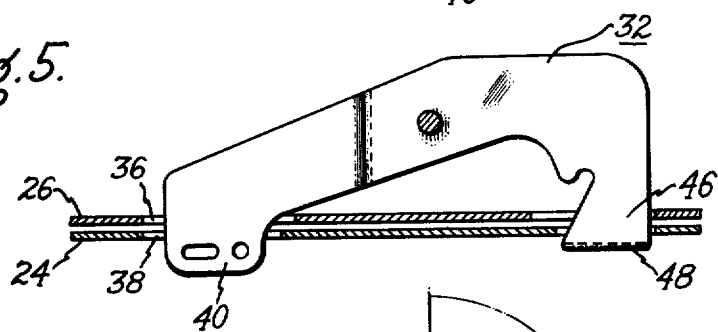
FIGURE 5 is a plan view, partly in section, showing the latch mechanism in its locked position.
Figure 6:
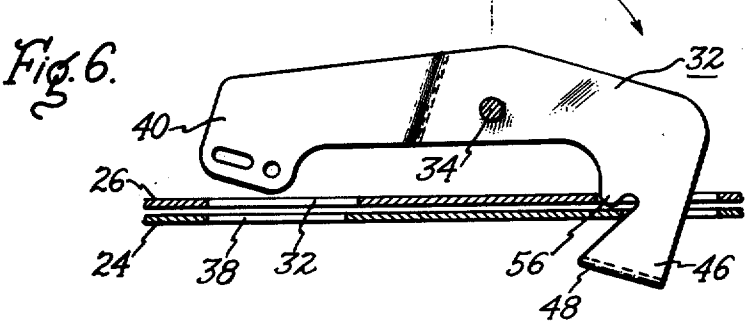
FIGURE 6 is a plan view similar to FIG. 5 showing the latch in unlocked position.

Referring now to FIGS. 5 and 6, the latch 32 of this invention is shown in its latched and unlatched position. As shown in FIG. 5, the latch portion 40 of the latch mechanism or U-shaped lever member 32 is within the slots 36 and 38 of the bottom wall 26 and cover flange 24, securely holding the bottom portion of the removable cover to the meter socket 10. Of course it will be understood, that the upper end of the removable cover has been placed under the overhanging flange 20 of the meter socket 10. Therefore, the removable cover 22 is securely fastened to the meter socket 10. When it is desired to unlock the removable cover from the meter socket 10, it is only necessary to grasp the operator 48 on the operating portion 46 of the U-shaped lever 32 and pull the lever down, thereby pivoting about the rivet member 34 thus moving the latch portion 40 out of slots 36 and 38. As can be seen from FIG. 6, as the U-shaped lever 32 is pivoted about the rivet 34, the stop member 56 contacts the cover flange 24, preventing any further movement of the U-shaped lever 32. Of course, it will be understood that the notch 42 in the bottom wall 26 of the meter socket 10 is provided so that when the removable cover is placed on the meter socket the operating portion 46 of the U-shaped lever 32 will slide within the notch, thereby allowing the cover to be firmly seated on the meter socket 10.

From the above description of the preferred embodiment of the cover latch of this invention, it is believed that those skilled in the art will readily understand the novelty and utility of the latch herein disclosed. It should be understood that various changes may be made in the constructional details of the latch of this invention, such as, for example, the elimination of the bend; or the elimination of the particular type of operator disclosed, or the stop member, and other constructional changes, without departing from the spirit of the invention hereinbefore set forth. Therefore, while there has been shown and described a particular preferred embodiment of the invention, as required by the patent statutes, it will be obvious to those skilled in the art that various changes and modifications may be made without departing from the spirit and scope of the invention as set forth in the claims appended hereto.

What is claimed as new and which it is desired to secure by Letters Patent of the United States is:

1. A meter socket comprising in combination a metallic box-like enclosure having an overhanging upper flange and a bottom wall thereof, a removable cover for said enclosure, said removable cover fitting beneath said overhanging flange and having a cover flange fitting below the bottom wall of the meter socket, a U-shaped lever pivotally secured to the lower portion of said removable cover, said U-shaped lever being provided with a latch portion at one end thereof, aligned slot means provided in said bottom wall of said meter socket and said cover flange, positioned to receive said latch portion, said U-shaped lever being provided with an operating portion at the other end thereof, said operating portion fitting through another slot in said cover flange and having an operator member below said cover flange, whereby said lever member may be pivoted about said pivotal mounting to move said lever portion into and out of engagement with said aligned slots in said bottom wall and said cover latch.

2. A meter socket comprising in combination a metallic box-like enclosure having an overhanging upper flange and a bottom wall thereof, a removable cover for said enclosure, said removable cover fitting beneath said overhanging flange and having a cover flange fitting below the bottom wall of the meter socket, a U-shaped lever pivotally secured to the lower portion of said removable cover, said U-shaped lever being provided with a latch portion at one end thereof, openings provided in said latch portion for receiving sealing means, aligned slot means provided in said bottom wall of said meter socket and said cover flange positioned to receive said latch portion, said U-shaped lever being provided with an operating portion at the other end thereof, said operating portion fitting through another slot in said cover flange and having an operator member below said cover flange, a notch in said bottom wall aligned with said other slot, whereby said lever member may be pivoted about said pivotal mounting to move said lever portion into and out of engagement with said aligned slots in said bottom wall and said cover latch.

3. A removable cover and latch for a meter socket comprising, a cover member having a central opening therein, a flange at the lower end of said cover, a U-shaped lever member pivotally secured intermediate its end to the lower portion of said cover, said U-shaped member being provided with a latch portion at one end thereof, a slot provided in said flange positioned to receive said latch portion of said lever, said U-shaped member also being provided with an operator portion at the other end thereof, said operator portion extending through a slot in said cover flange and being provided with an operator member for pivoting said U-shaped member.

4. A removable cover and latch for a meter socket comprising, a removable cover member having a central opening therein, a flange member at the lower end of said cover, a U-shaped lever member pivotally mounted intermediate its end to the lower portion of said removable cover, said U-shaped member being provided with a latch portion at one end thereof, a slot provided in said cover flange positioned to receive said latch portion, a second slot provided in said cover flange, said U-shaped member also being provided with an operator portion at the other end thereof, said operator portion extending through said second slot in said cover flange and being provided with an operator member for pivoting said U-shaped member about said pivotal mounting, and stop member on said U-shaped lever contacting said cover flange in one position of said U-shaped lever to prevent said latch portion from extending into said opening in said cover.

References Cited in the file of this patent

UNITED STATES PATENTS

| | | |
|---|---|---|
| 1,484,882 | Gray | Feb. 26, 1924 |
| 1,592,405 | Worley et al. | July 13, 1926 |
| 1,977,641 | Loeber | Oct. 23, 1934 |
| 2,671,683 | Heyman et al. | Mar. 9, 1954 |
| 2,695,923 | Lajeunesse et al. | Nov. 30, 1954 |
| 2,742,173 | Janson | Apr. 17, 1956 |

UNITED STATES PATENT OFFICE

CERTIFICATE OF CORRECTION

Patent No. 3,112,839 December 3, 1963

Dankmar Hallbauer

It is hereby certified that error appears in the above numbered patent requiring correction and that the said Letters Patent should read as corrected below.

Column 1, line 63, for "mechanism" read -- mechanisms --; column 4, line 67, and column 5, line 5, for "end", each occurrence, read -- ends --; column 6, line 1, after "and" insert -- a --.

Signed and sealed this 26th day of May 1964.

(SEAL)
Attest:

ERNEST W. SWIDER
Attesting Officer

EDWARD J. BRENNER
Commissioner of Patents